(12) United States Patent
Rodriguez (10) Patent No.: US 7,516,454 B1
(45) Date of Patent: Apr. 7, 2009

(54) FEEDBACK INTEGRATION OF DYNAMIC OPERATIONS

(75) Inventor: John Ernest Rodriguez, Capitola, CA (US)

(73) Assignee: Lightsurf Technologies, Inc., Santa Cruz, CA (US)

(*) Notice: Subject to any disclaimer, the term of this patent is extended or adjusted under 35 U.S.C. 154(b) by 976 days.

(21) Appl. No.: 10/808,767

(22) Filed: Mar. 24, 2004

(51) Int. Cl.
*G06F 9/46* (2006.01)
(52) U.S. Cl. .................................. 718/100
(58) Field of Classification Search .......... 718/100
See application file for complete search history.

(56) References Cited

U.S. PATENT DOCUMENTS 6,314,463 B1 * 11/2001 Abbott et al. ............ 709/224

OTHER PUBLICATIONS

Cooperative Scheduling of Tasks for Networked Uninhabited Autonomous Vehicles Alvaro Gil, Kevin Passino, Andrew Sparks IEEE 2003.*
A Flexible Monitoring Platform to Build Cluster Management Services Saab, Bonnaire, Foilliot IEEE 2000.*

* cited by examiner

*Primary Examiner*—Meng-Ai An
*Assistant Examiner*—Mengyao Zhe
(74) *Attorney, Agent, or Firm*—Blakely, Sokoloff, Taylor & Zafman, LLP; Judith A. Szepesi (57) ABSTRACT

A method and apparatus for self-discovering throttling is described. The system includes a first queue to track a current rate of task completion and a second queue to track an average rate of task completion over time. The system further includes a comparator to compare an average of the first queue and an average of the second queue. The system includes a throttle to adjust the number of connections based on the results from the comparator.

27 Claims, 6 Drawing Sheets

FEEDBACK INTEGRATION OF DYNAMIC OPERATIONS

FIELD OF THE INVENTION

The present invention relates to on-demand computing resource allocation.

BACKGROUND

Allocating computing resources can be difficult. For example, in multimedia messaging a large number of Multimedia Messages (MMS) can be concurrently sent to a Multimedia service center (MMSC). The number of messages can be so large that the computer system is overwhelmed. The parts that can be overwhelmed are:
1) CPU (central processing unit/processors)
2) bandwidth
3) memory
4) databases
5) other parts In traditional resource allocation schemes, the system monitored each of the resources, and attempted to determine which resource was being overwhelmed. This added more overhead to the system, and thus slowed down an overwhelmed system even further. Additionally, the performance of a system may be affected by external factors, such as the available bandwidth, the capability of external system which sends or receives data from the system, or other factors. Therefore, an improved method of resource allocation would be useful.

SUMMARY OF THE INVENTION

A method and apparatus for self-discovering throttling is described. The system includes a first queue to track a current rate of task completion and a second queue to track an average rate of task completion over time. The system further includes a comparator to compare an average of the first queue and an average of the second queue. The system includes a throttle to adjust the number of connections based on the results from the comparator.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a resource manager that dynamically adjusts to the rapidly changing demands of a server is described. In one embodiment, the server is a client/server called a Multimedia Message Service Center (MMSC). The MMSC provides a store and forward facility for multimedia messages sent across a mobile network. The MMSC may also provide a formatting role to enable messages to be "optimized" to the receiving handsets capability. The resource manager may also be applied to other applications.

This is a Feedback Integration of Dynamic Operations (FIDO) system that monitors a computer system. The example that will be described is for an MMSC. However, one of skill in the art would understand that this technique may be used for other applications.

Continuous measurements are made to determine if the system is slowing down or speeding up. If the system is slowing down then the number of tasks in the queue is reduced. Likewise if the system is speeding up, or under a light load, then more tasks are queued. The present invention is an automated feedback discovery process that allows the optimal rate of task execution to occur without any intervention.

It is advantageous to have the controlled system itself discover the optimal rate because each configuration of MMSC can differ. Automatic discovery allows the hardware or software to be replaced or updated without any tuning by administrators. Automatic discovery also allows observation and rate adjustments in response to the behavior and status of factors/elements outside the control of the system. For example, the MMSC may be sending MMS messages to a Foreign Network MMSC (FNM). The FNM is not under operational control of the primary MMSC. If the FNM has a smaller capacity than the primary MMSC, the FNM may not be able to handle the number of messages received and will begin to slowdown. Even though this slowdown is outside the primary MMSC's realm, it is still measurable as part of the send cycle, as will be described below. Therefore, the primary MMSC, running the FIDO system, can slow down its sending rate appropriately, and avoid overwhelming the FNM.

The primary characteristics of FIDO may include:
1) Dynamically adjust the task execution rate.
2) Requires no information about machine or network capacities to automatically discover the optimal task execution rate.
3) Automatically adjusts the task execution rate on the host computer system.
4) Automatically adjust the task execution rate when external computers or networks become overloaded.
5) Increases or reduces the number of measurements taken dynamically, in order to quickly respond to system changes.
6) Uses fast algorithms for feedback analysis.
7) Uses very little CPU time for feedback analysis.
8) Uses very little memory for feedback analysis.

It may never be possible to monitor all elements of a system and understand the whole. For this reason, the system, in accordance with the present invention, is measured by the speed of task execution. It does not matter what may be slowing down or speeding up the tasks, only that the task speed is changing. This enables the system to account for external factors as well as internal factors.

Figure 1:
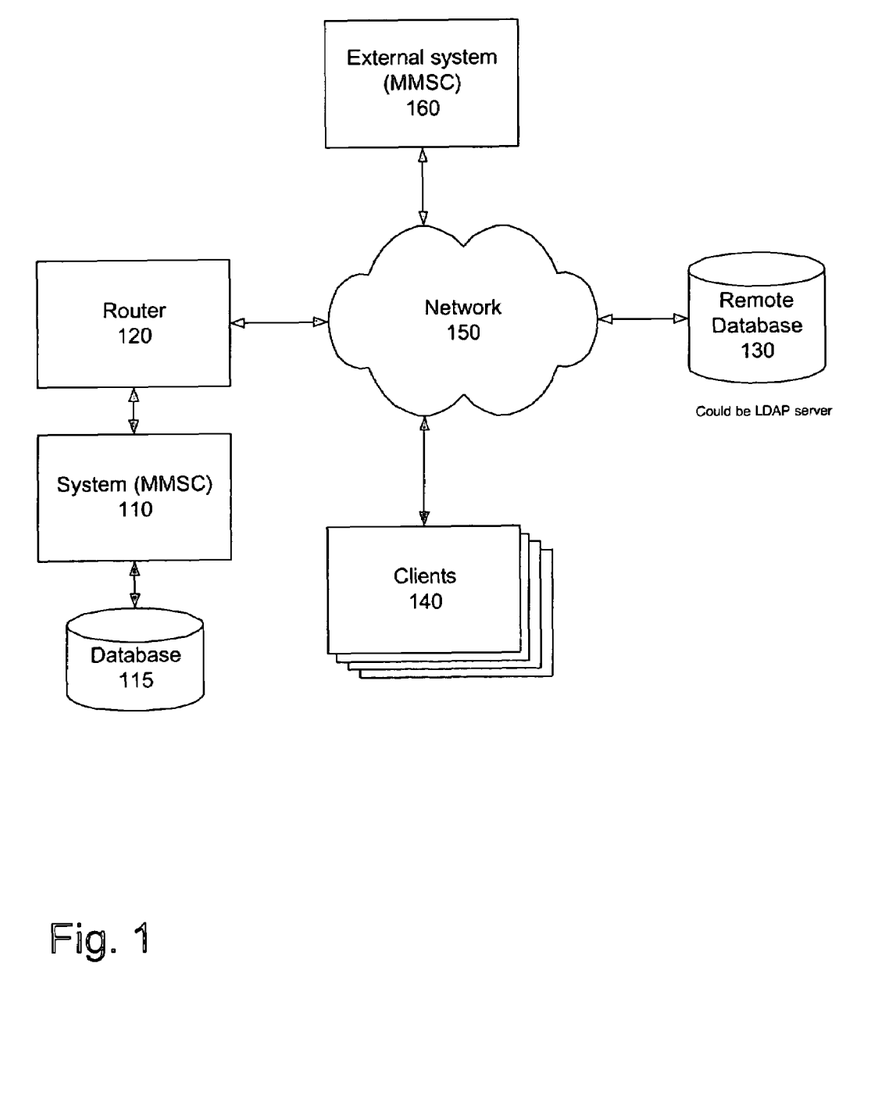
FIG. 1 is a network diagram illustrating on embodiment of a network in which the MMSC implementing the present invention may be used.

FIG. 1 is a network diagram illustrating one embodiment of a network in which the MMSC implementing the present invention may be used. The system 110 includes the FIDO monitor, in accordance with the present invention. In one embodiment, the system is a multimedia message service center (MMSC) for forwarding multi-media messages to client systems 140. Alternatively, the system 110 may be any computer system which handles multiple tasks or uses multiple resources.

The system 110, in one embodiment, is coupled to a network 150 through router 120. The network may be the Internet, a local area network (LAN), a Wide area network (WAN), or any other network or series of networks. Other devices, including external systems 160 and clients 140 may connect to, receive messages from, or send messages to the system 110 through network 150. If system 110 is an MMSC, external system 160 may be a foreign MMSC which is not controlled by the primary MMSC 110.

The system 110 may also be coupled to a local 115 or remote 130 database. The database may be an LDAP or similar system, or any other type of data storage mechanism. As described above, the system 110 attempts to correct its output, such that it does not overwhelm external systems such as database 115, database 130, clients 140, or external systems 160. Furthermore, the system 110 attempts to ensure a connection stream regardless of external factors such as network speed, the ability of external systems 160 to handle load, etc.

Figure 2:
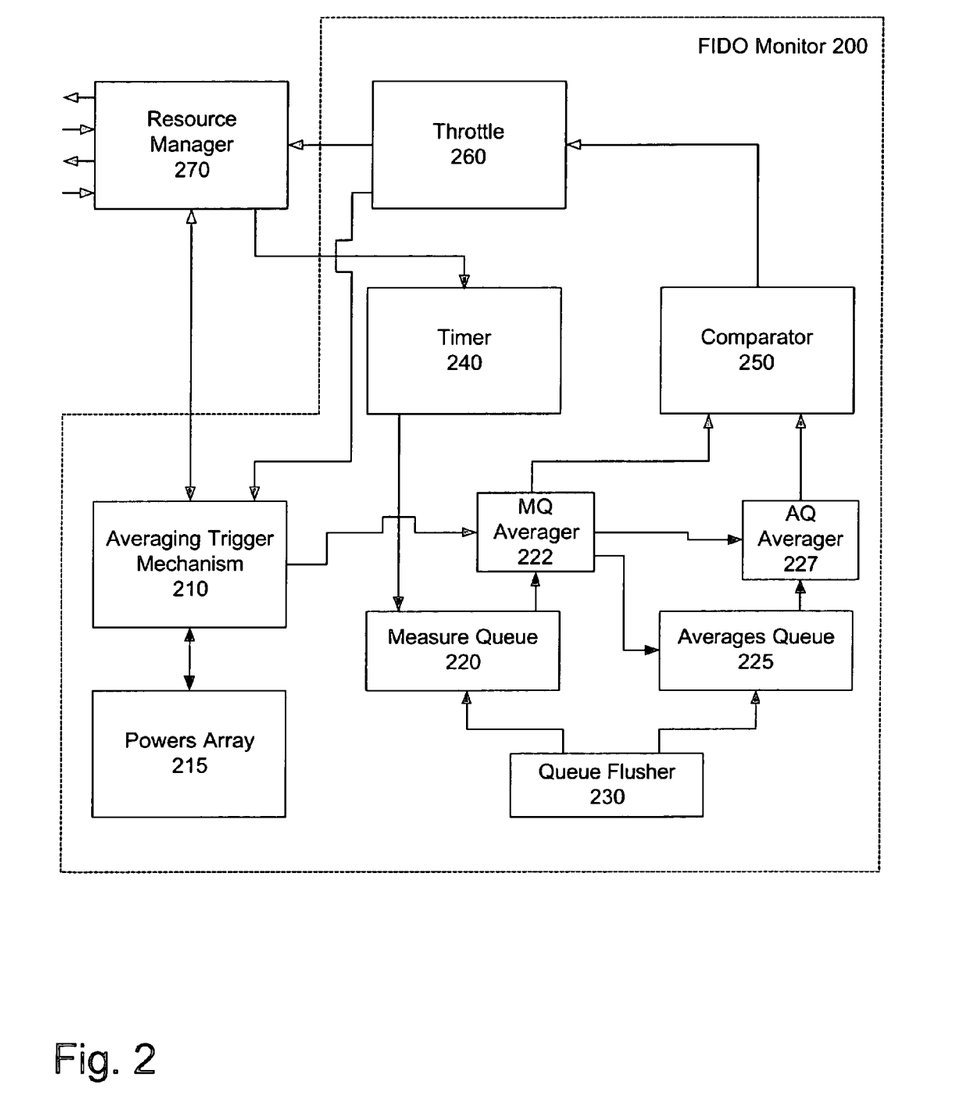
FIG. 2 is a block diagram of one embodiment of the system.

FIG. 2 is a block diagram of one embodiment of the system. The FIDO monitor 200 is coupled to the resource manager 270, and the output of the FIDO monitor 200 sets the number of connections available. The term "connections" is used to generically refer to all resources which may be used by system 110. These connections may include network connections, database accesses, etc.

Timer 240 obtains from resource manager 270 the starting and ending time for a resource use. The timer 240 calculates the length of time a resource was in use. In one embodiment, the time starts when a resource is granted to a request, and ends when the resource is released. The time is added to the measure queue 220.

In one embodiment, timer 240 measures only one subtask of a complex task or set of tasks. The subtask is one piece of the complete set of steps performed by the system. However, the subtasks are interdependent, and therefore the overall load on the system is reflected by the timing of a chosen subtask.

For example, in an MMSC, there are four subtasks in sending out a message to a user. First, a message is received and saved to a process queue. Second, the message is processed appropriately. Third, a notification is sent to the recipient, and the message is moved to a storage queue. And finally, fourth, the retrieval message is received and the message is sent to the recipient. By monitoring any one of these asynchronous steps, the system monitors the overall load on the MMSC. In one embodiment, the system monitors the first step, receiving a message and storing it in a process queue. One of skill in the art would understand that any other processes may similarly be broken into substeps, and that the present process may monitor one or more of these substeps.

The averaging trigger mechanism 210 tracks the number of entries in the measure queue 220. When a preset number of entries is reached, the averaging trigger mechanism 210 triggers a comparison.

In one embodiment, the "preset number of entries" is a number derived from a powers array 215. In one embodiment, the powers array 215 includes numbers which are powers of two. In one embodiment, the powers array 215 is: {2, 4, 8, 16, 32, 64, 128, 256}. The powers array has a pointer, controlled by the averaging trigger mechanism 210, which selects the entry in the powers array 215 that will be used as the trigger. For example, if the trigger is 32, after 32 entries into the measure queue 220, a comparison is triggered. Then, depending on the outcome the trigger will be set to 16 or 64, for the next comparison. Alternatively, the comparison may be done periodically based on a static count of connections, time elapsed, or any other factor that may be useful.

The measure queue 220 receives an entry from the timer 240 every time a connection is released. In one embodiment, measure queue 220 is a circular queue. That is, the oldest entry is overwritten when there are no further empty slots. This eliminates the need for queue flusher 230. In another embodiment, the measure queue 220 is a standard queue, and is periodically flushed, as will be described below. In one embodiment, the measure queue 220 and averages queue 225 have a size corresponding to the largest number in the powers array 215.

If a comparison is triggered by the trigger mechanism 210, the averagers 222, 227 calculate the average of the values in the measure queue 220 and the averages queue 225, respectively. The comparator 250 compares the two values. In one embodiment, the comparator may also take into account the ratio (sensitivity multiplier) in this comparison. After the average of the averages queue 225 and measure queue 220 are calculated, if the queues need to be flushed (i.e. are not circular queues, and are full) the queue flusher 230 flushes the queues. Then, the output of the measure queue averager 222 is added to the averages queue 225.

Then, based on the outcome of the comparison, the throttle 260 either sets the number of connections higher, lower, or leaves them the same. The throttle 260 also provides feedback to the trigger mechanism 210, which adjusts the value of the powers array 215 that will be used for the next comparison. In this way, the feedback system functions without external data or adjustment required.

Figure 3:
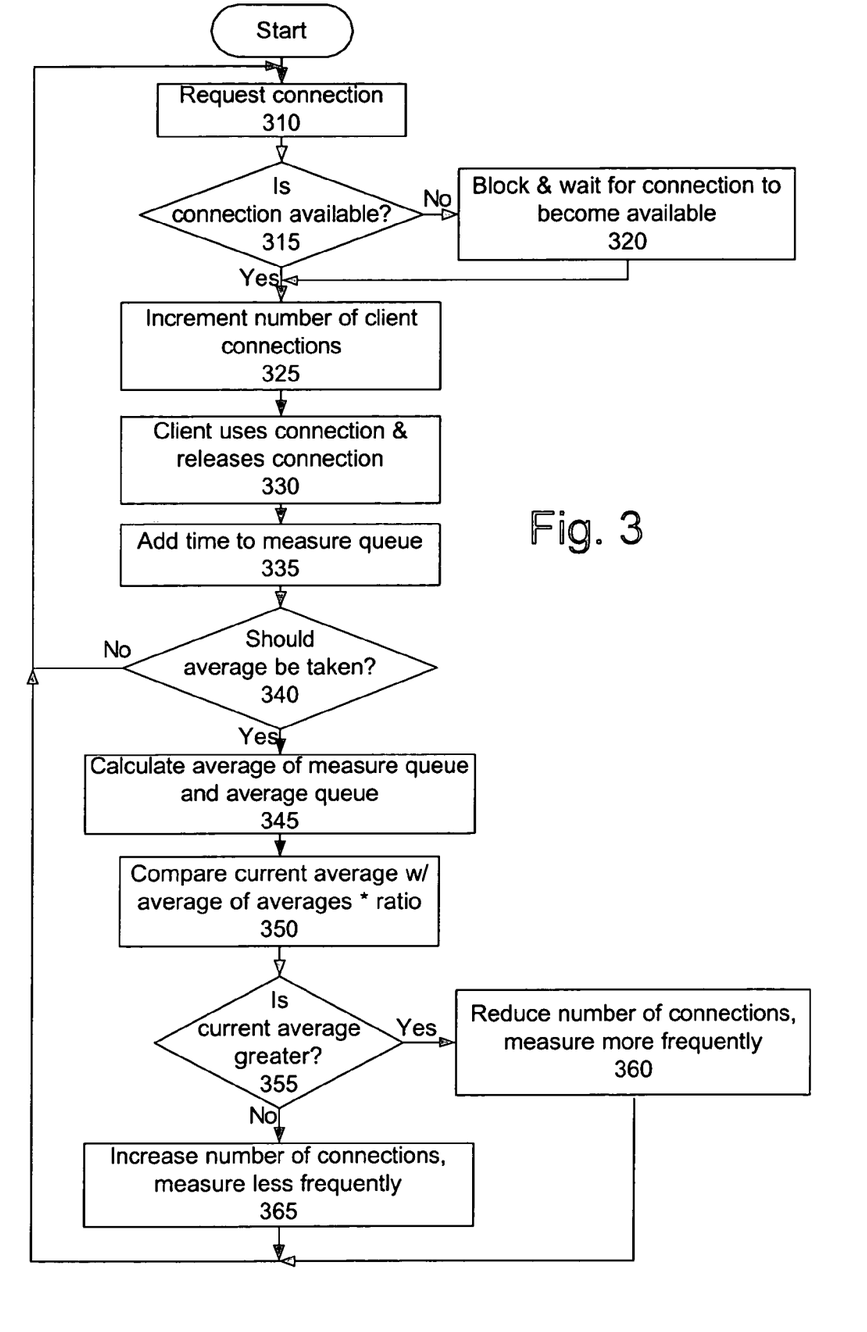
FIG. 3 is an overview flowchart of the present invention.

FIG. 3 is an overview flowchart of the present invention. The process starts at block 310, when a connection is requested. At block 315, the process determines whether a connection is available. If a connection is not available, at block 320, the system holds the request and waits for a connection to be available. When a connection becomes available, the process continues to block 325. In one embodiment, the system creates a list of blocked tasks. The system then notifies one blocked task to resume, whenever a connection is freed up. In one embodiment, the process is first-in-first-out.

At block 325, the number of client connections in use is incremented.

At block 330, the client uses the connection, and then releases the connection. In one embodiment, when the client receives the connection, a grant time is registered. When the client releases the connection an end time is registered.

At block 335, the time (delta between grant time and end time) is added to the measure queue. The measure queue is used to collect time data.

At block 340, the process determines whether an average should be taken. In one embodiment an exponentially increasing/decreasing function is used, based on the powers array, to determine if the average should be taken. This minimizes the number of measurements.

If no average should be taken, the process returns to block 310. In one embodiment, this process runs in parallel for each active connection on the system.

If it has been determined that an average measurement should be taken, the process continues to block 345. At block 345, the average of the measure queue and the averages queue is obtained.

At block 350, the process compares the current average, obtained from the measure queue (current average) with the queue averages obtained from the average queue times a ratio (statistical value). The ratio is a sensitivity multiplier, that affects reaction speed. In one embodiment, the ratio may vary from 1, indicating immediate response, to 3. In one embodiment, the ratio may be adjusted between 1 and 2, depending on the level of responsiveness preferred. In another embodiment, the ratio multiplier may be eliminated entirely.

At block 355, the process determines whether the current average is greater than the statistical value. If so, the process continues to block 360.

If the current average is greater, then the system is slowing down, with the currently executed tasks moving faster than the past averages. Thus, at block 360, the number of connections available are reduced and the system is triggered to measure more frequently.

If the current measurement is less than the statistical value the system is steady or speeding up. In that case, the process continues to block 365, and the number of connections available are increased, and the system is triggered to measure less frequently. The process then returns to block 310.

Figure 4A:
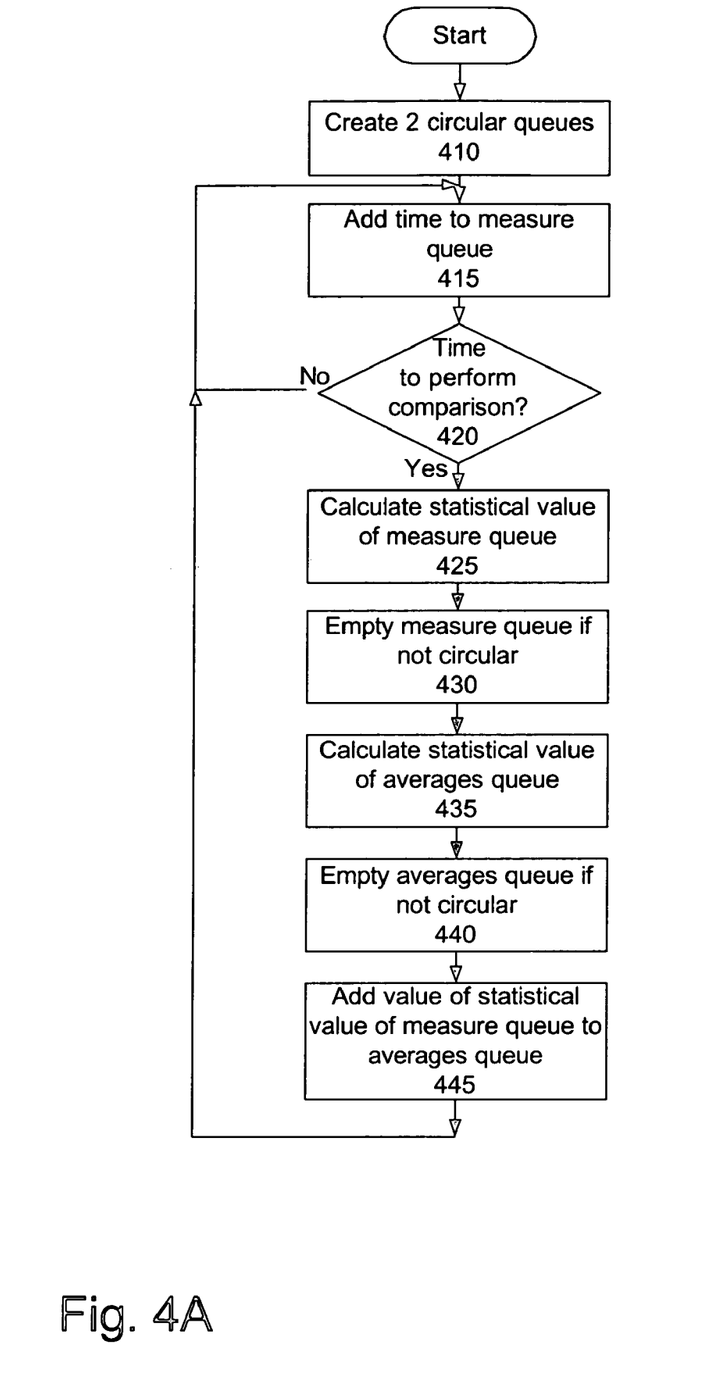
FIG. 4A is a flowchart of one embodiment of the queue updating method.

FIG. 4A is a flowchart of one embodiment of the queue updating method. At block 410, two queues are created. In one embodiment, the queues are circular. Alternatively, the queues may be non-circular.

At block 415, time is added to the measure queue. The term "time" refers to a period of time that a connection was used (from grant to release in one embodiment). At block 420, the process determines whether to perform a comparison. As noted above, this is triggered by the powers array, in one embodiment. If it is not yet time to perform a comparison, the process returns to block 415, and awaits further times to be added to the measure queue. Otherwise, the process continues to block 425.

At block 425, the statistical value of the measure queue is computed. In one embodiment, the statistical value is the "average." In another embodiment, the statistical value may be the mean. Alternative statistical values, including standard deviations, may also be calculated.

At block 430, the measure queue is emptied, if it is not a circular queue. In another embodiment, the measure queue is only emptied if it is "full." In that instance, the process first determines whether the queue is full, and empties it only if it is.

At block 435, the statistical value of the averages queue is computed. At block 440, the averages queue is emptied, if it is full, and not a circular queue.

The statistical values of the measure queue and the averages queue is used, as described above, for a comparison.

At block 445, the statistical value of the measure queue is added to the averages queue, and the process returns to block 415, to continue the process.

Figure 4B:
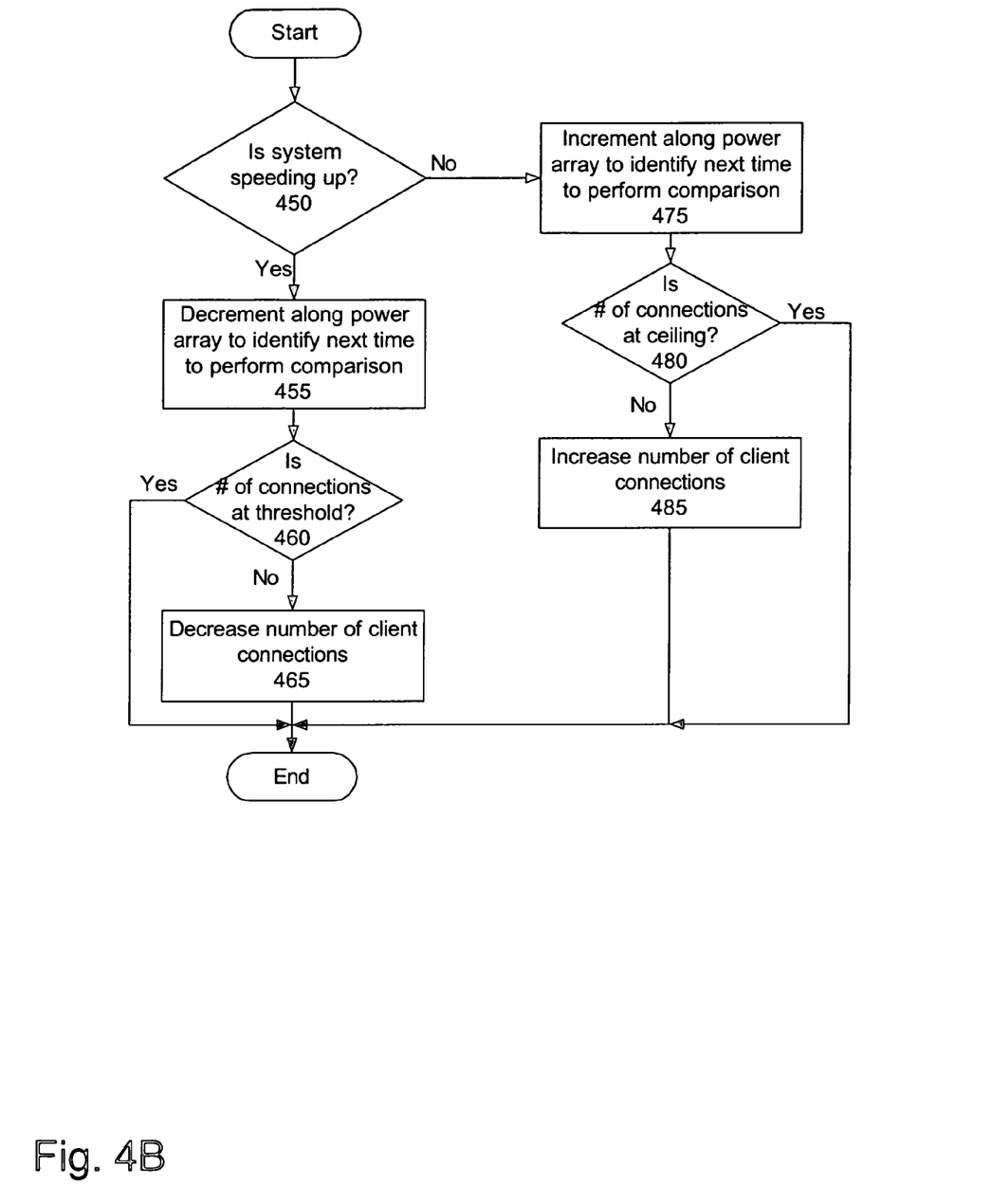
FIG. 4B is a flowchart of one embodiment of adjusting the process based on the comparison results.

FIG. 4B is a flowchart of one embodiment of adjusting the process based on the comparison results. At block 450, the process determines whether the system is speeding up. The system speeding up indicates that the current connections are being released faster than past connections. If the system is speeding up, the process continues to block 455.

At block 455, the system decrements along the power array, to identify the next time to perform a comparison. If the power array is {2, 4, 8, 16} and was, for example, at 4, the system decrements it to 2. Thus, when two more values are added to the measure queue, the comparison will be performed again.

At block 460, the process determines whether the number of connections is at a threshold. The threshold is the lower limit of the number of available connections. In one embodiment, the threshold is the original starting number of connections. In another embodiment, the threshold may be adjusted by an administrator. In yet another embodiment, the threshold may be one.

If the value is at the threshold, the process directly ends. If the value is not at the threshold, at block 465 the number of client connections available is decreased. The process then ends.

If, at block 450, the system was determined to be slowing down, or holding steady, rather than speeding up, the process continued to block 475.

At block 475, the system increments along the power array, to identify the next time to perform a comparison. If the power array is {2, 4, 8, 16} and was, for example, at 4, the system increments it to 8. Thus, when eight more values are added to the measure queue, the comparison will be performed again.

At block 480, the process determines whether the number of connections is at a ceiling. The ceiling is the upper limit of the number of available connections. In one embodiment, there may not be a ceiling, i.e. the ceiling may be set to infinity.

If the value is at the ceiling, the process directly ends. If the value is not at the ceiling, at block 485 the number of client connections available is increased. The process then ends.

Figure 5:
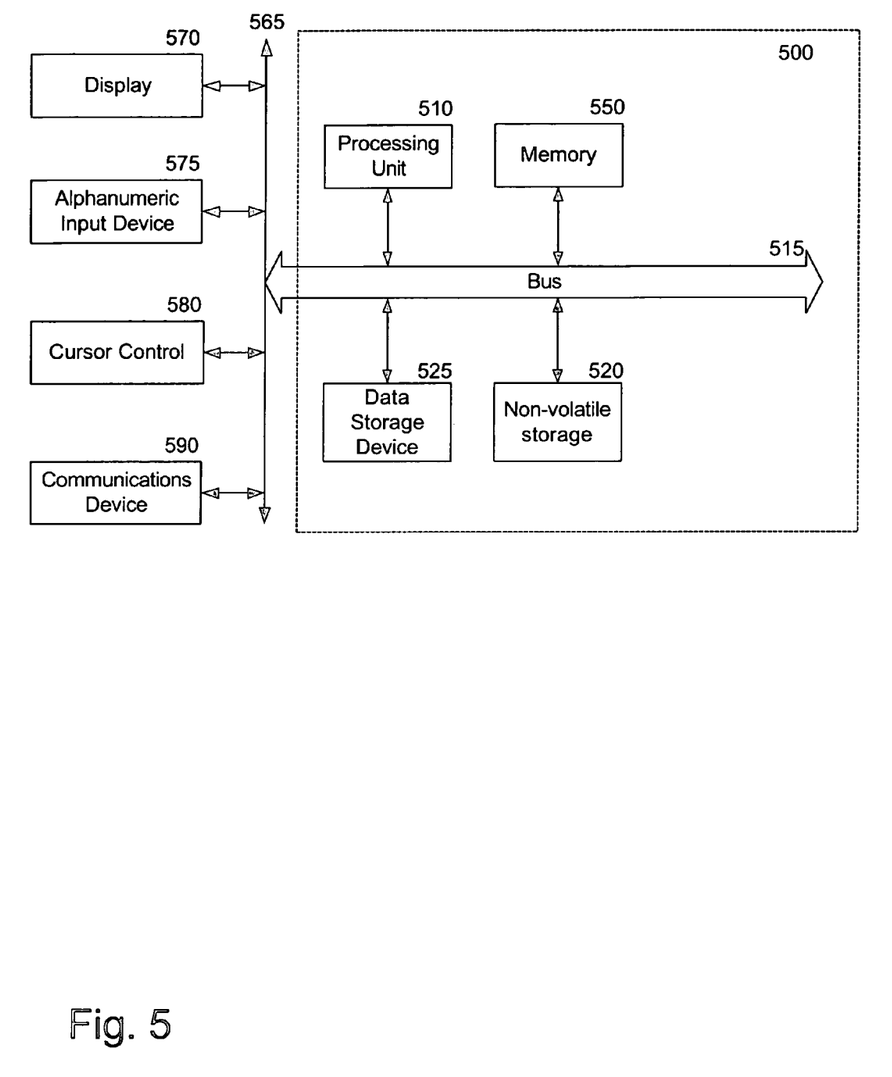
FIG. 5 is a block diagram of one embodiment of a computer system on which the present invention may be implemented.

FIG. 5 is a block diagram of one embodiment of a computer system on which the present invention may be implemented. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a cathode ray tube (CRT) or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The present invention may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 510. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a first queue to track a current rate of task completion;
   a second queue to track an average rate of task completion over time;
   a comparator to compare an average of values stored in the first queue and an average of values stored in the second queue; and
   a throttle to
      reduce a number of connections available on the apparatus if the comparator indicates that the average of the first queue is larger than the average of the second queue, wherein the comparator triggers comparisons more often as the number of connections is decreased,
      increase the number of connections available if the average rate of task completion is lower than the average of the average rates of task completion,
      wherein the connections comprise network connections for sending messages, and wherein the apparatus comprises a multimedia messaging service center.

2. The apparatus of claim 1, wherein the first queue and the second queue are circular queues.

3. The apparatus of claim 1, further comprising:
   a timer to compute a length of time a connection is used and insert the time into the first queue.

4. The apparatus of claim 1, wherein the average of values stored in the first queue is inserted into the second queue.

5. The apparatus of claim 1, further comprising:
   a trigger mechanism to trigger a comparison, the trigger mechanism triggering comparisons less often as the number of connections is increased.

6. The apparatus of claim 5, further comprising:
   a powers array to indicate when to trigger a comparison to the trigger mechanism, the powers array being an exponentially increasing/decreasing function.

7. The apparatus of claim 1, further comprising:
   a sensitivity multiplier applied to the average of the second queue to affect reaction speed.

8. The apparatus of claim 1, wherein the rate of task completion comprises timing one subtask of a complex task, the subtask reflecting a load on the apparatus.

9. A method of resource allocation comprising:
   comparing a current average rate of task completion of a system to an average of averages, wherein the average of averages is the average of a plurality of the results of each of the current average rate of task completion over time;
   reducing a number of tasks executed by the system if the current average rate of task completion is larger than the average of averages, wherein the comparison is triggered more frequently as the number of tasks executed is reduced; and
   increasing the number of tasks executed by the system if the current average rate of task completion is less than the average of the averages, wherein the tasks executed by the system includes sending messages over a network from a multimedia messaging service center.

10. The method of claim 9, further comprising:
    triggering the comparison based on a number of measurements of the current rate of task completion reaching a predetermined threshold.

11. The method of claim 10, further comprising:
    adjusting the predetermined threshold based on results of a last comparison.

12. The method of claim 11, wherein the predetermined threshold is increased and the comparison is triggered less frequently if the system is speeding up.

13. The method of claim 12, wherein the predetermined threshold is set by a powers array, the powers array being a powers-of-two array; and the predetermined threshold is adjusted by shifting along the powers-of-two array to speed up or slow down the rate of triggering the comparison.

14. The method of claim 9, further comprising:
timing a period of time that a connection is used; and
inserting the period of time into a first queue, the average of the first queue being the current average rate of task completion.

15. The method of claim 14, further comprising:
inserting the average of the first queue into a second queue, the average of the second queue being the average of averages.

16. The method of claim 15, wherein the first queue and the second queue are circular queues.

17. The method 15, wherein the average of the first queue and the average of the second queue are calculated when a comparison is triggered.

18. The method of claim 17, wherein a current average of the first queue is inserted into the second queue after the average of the second queue is calculated.

19. The method of claim 9, wherein the rate of task completion is determined by measuring a length of time required to complete one subtask of a complex task, the subtask reflecting an overall load on the system.

20. An apparatus comprising:
a first queue to track a current rate of task completion;
a second queue to track an average rate of task completion over time;
a comparator to compare an average of values stored in the first queue and an average of values stored in the second queue;
a throttle to reduce a number of connections available on the apparatus if the comparator indicates that the average of the first queue is larger than the average of the second queue, wherein the comparator triggers comparisons more often as the number of connections is decreased, wherein the connections comprise network connections for sending messages, and wherein the apparatus comprises a multimedia messaging service center; and
a powers array to indicate when to trigger a comparison to the trigger mechanism, the powers array being an exponentially increasing/decreasing function.

21. The apparatus of claim 20, wherein the rate of task completion comprises timing one subtask of a complex task, the subtask reflecting a load on the apparatus.

22. An apparatus comprising:
a first queue to track a current rate of task completion;
a second queue to track an average rate of task completion over time;
a comparator to compare an average of values stored in the first queue and an average of values stored in the second queue;
a throttle to reduce a number of connections available on the apparatus if the comparator indicates that the average of the first queue is larger than the average of the second queue, wherein the comparator triggers comparisons more often as the number of connections is decreased, wherein the connections comprise network connections for sending messages, and wherein the apparatus comprises a multimedia messaging service center; and
a sensitivity multiplier applied to the average of the second queue to affect reaction speed.

23. The apparatus of claim 22, wherein the rate of task completion comprises timing one subtask of a complex task, the subtask reflecting a load on the apparatus.

24. A method of resource allocation comprising:
comparing a current average rate of task completion of a system to an average of averages, wherein the average of averages is the average of a plurality of the results of each of the current average rate of task completion over time;
reducing a number of tasks executed by the system if the current average rate of task completion is larger than the average of averages, wherein the comparison is triggered more frequently as the number of tasks executed is reduced, and wherein the tasks executed by the system includes sending messages over a network from a multimedia messaging service center; and
using a powers array to indicate when to trigger a comparison to the trigger mechanism, the powers array being an exponentially increasing/decreasing function.

25. The method of claim 24, wherein the rate of task completion comprises timing one subtask of a complex task.

26. A method of resource allocation comprising:
comparing a current average rate of task completion of a system to an average of averages, wherein the average of averages is the average of a plurality of the results of each of the current average rate of task completion over time;
reducing a number of tasks executed by the system if the current average rate of task completion is larger than the average of averages, wherein the comparison is triggered more frequently as the number of tasks executed is reduced, wherein the tasks executed by the system includes sending messages over a network from a multimedia messaging service center; and
applying a sensitivity multiplier to the average of averages to affect reaction speed.

27. The method of claim 26, wherein the rate of task completion comprises timing one subtask of a complex task.

* * * * *